United States Patent Office 3,360,570
Patented Dec. 26, 1967

3,360,570
RECOVERY OF OXIDATION PRODUCTS
Thomas Bewley, Epsom, England, and William Webster, Grangemouth, Scotland, assignors, by mesne assignments, to Hercules Incorporated, a corporation of Delaware
No Drawing. Filed Dec. 12, 1963, Ser. No. 329,946
4 Claims. (Cl. 260—610)

This invention relates to the oxidation of dialkyl aromatic hydrocarbons.

The oxidation of dialkyl aromatic hydrocarbons; such as the diisopropylbenzenes, with molecular oxygen to produce hydroperoxides, has normally been carried out at a pH within the alkaline range, but it has more recently been found desirable to employ a pH in the acid range, for example from 2.8 to 7.0. In the oxidation of m-diisopropylbenzene, p-diisopropylbenzene and other hydrocarbons which have two alkyl substituents on an aromatic ring, each containing a tertiary carbon atom in the α-position with respect to the ring, it is possible to obtain both mono- and dihydroperoxides, as well as hydroxyhydroperoxides.

Since the object of oxidising such hydrocarbons is to produce dihydroperoxides which may thereafter be converted into dihydroxy aromatic compounds, it is necessary to separate the dihydroperoxides produced from the other products of the oxidation. This may be achieved by extracting dihydroperoxide from the mixture with an aqueous solution of an alkali, but the remaining organic phase becomes contaminated with alkali, making it unsuitable for recycle to an oxidation stage operated under acid conditions without further treatment.

According to the invention, the process for the oxidation of a dialkyl aromatic hydrocarbon having the formula

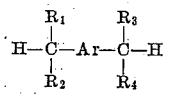

wherein Ar is an arylene group and $R_1$, $R_2$, $R_3$ and $R_4$ are alkyl groups, comprises contacting the dialkyl aromatic hydrocarbon with molecular oxygen, subjecting the oxidate, which contains the monohydroperoxide and dihydroperoxide of the dialkyl aromatic hydrocarbon, to extraction with an aqueous solution of an alkali metal hydroxide, treating the resulting organic phase, which is substantially free from dihydroperoxide, with gaseous carbon dioxide, washing the so treated organic phase with water, and recycling the washed organic phase to the oxidation stage.

The dialkyl aromatic hydrocarbon used in the oxidation reaction has the above formula, in which the alkyl groups $R_1$, $R_2$, $R_3$ and $R_4$ suitably have not more than four carbon atoms. They may thus be methyl, ethyl, propyl or butyl groups, and they may be all similar groups or may differ one from another. The arylene group may be otherwise unsubstituted or may contain alkyl substituents which do not contain tertiary carbon, such as methyl and ethyl groups. Particularly preferred dialkyl aromatic hydrocarbons are those in which all the R groups are methyl groups, especially m-diisopropylbenzene and p-diisopropylbenzene.

The oxidation may be carrried out under a variety of conditions, for example at an alkaline pH, but is preferably carried out at a pH within the range from about 3 to about 7. The oxidising agent is molecular oxygen, either alone or with an inert diluent such as nitrogen, and the oxidation may be carried out over a relatively wide range of temperatures, for example from 50° C. to 150° C. It is preferred that the oxidation should be carried out to such an extent that the oxidate contains between 40% and 100% by weight of all hydroperoxides, calculated on the basis of monohydroperoxides.

The oxidate is extracted with sufficient of an aqueous solution of an alkali metal hydroxide to form an aqueous alkali solution of the dihydroperoxide. The alkali metal hydroxide may be potassium hydroxide or sodium hydroxide, preferably in an aqueous solution containing from 1% to 12% by weight of alkali metal hydroxide. The desired dihydroperoxide is recovered in the aqueous phase in solution in the aqueous alkali metal hydroxide, from which it may be recovered by known methods for conversion into the corresponding dihydroaromatic compound, such as resorcinol or hydroquinone.

The organic phase from the alkali extraction is neutralised by treatment with gaseous carbon dioxide. The gaseous carbon dioxide is brought into intimate contact with the organic phase, at least sufficient carbon dioxide being employed to neutralise the alkali content thereof. The treatment with carbon dioxide may be carried out over a relatively wide range of temperatures, preferably ranging from about 15° to about 80° C. The carbon dioxide may be brought into intimate contact with the organic phase by any suitable method of contacting gases with liquids. Thus, the gas may be introduced into a vessel through a suitable distribution apparatus, preferably with stirring of the contents of the vessel. In a preferred method, however, the organic phase and the carbon dioxide are passed in countercurrent flow through a packed column or tower.

The treated organic phase is subjected to water washing to remove salts such as alkali metal carbonates or bicarbonates. Such water washing may be carried out after the carbon dioxide treatment in a suitable washer, or may be carried out simultaneously with the carbon dioxide treatment, for example by feeding organic phase and water at the top of a scrubbing column or tower, and passing gaseous carbon dioxide in countercurrent flow thereto. The amount of water used for washing is not particularly critical, since the salts formed are very soluble in water. However, when the water washing is carried out simultaneously with the carbon dioxide treatment as described above, the ratio of the feeds of water and organic phase, to the scrubbing column or tower is preferably at least 5:1; it is not normally necessary to exceed a ratio of 15:1.

It may be advantageous to combine the process of the invention with a known mechanical method for the separation of two liquid phases. Thus a better separation of the alkaline extract from the residual organic phase may be achieved by centrifuging the material before separation or after separation of the bulk of the alkali solution. After subjecting the residual organic phase to the carbon dioxide treatment, and to the water wash, the separation of the aqueous salt solution from the organic phase may also be improved by centrifuging.

By using the process of the invention, it is possible to obtain, after extraction with alkali and treatment with carbon dioxide and water, a residual organic phase for recycle to the oxidation stage containing 0.004 gram of alkali calculated as sodium hydroxide, or less, per hundred grams of oxidate. This organic phase is recycled to the oxidation stage accordingly, together with fresh dialkyl aromatic hydrocarbon, where its low content of alkali has no significant effect upon the pH control in that stage. The oxidation may thus be conducted in the acid range of pH, for example from about 3 to about 7, with consequent increase in oxidation efficiency.

The process of the invention is illustrated by the following examples.

Example 1

In this example the oxidation of m-diisopropylbenzene in the presence of two different concentrations of alkali was compared.

Batch A contained 0.2% of sodium carbonate by weight, and was oxidised with molecular oxygen for 35 hours. Batch B contained 2.4% of sodium carbonate and was oxidised for 38.5 hours. The product m-diisopropylbenzene dihydroperoxide was isolated from each oxidate by extraction with aqueous sodium hydroxide, followed by neutralisation of the alkaline extract with gaseous carbon dioxide.

The product from Batch A was found to contain 95.1% by weight hydroperoxide, calculated as pure m-diisopropylbenzene dihydroperoxide, while that from Batch B contained only 92.2%. Infra red spectroscopic analysis showed that the two products contained respectively 5% and 12% of the m-hydroxyhydroperoxide as main by-product of the oxidation.

Example 2

2000 parts by weight of p-diisopropylbenzene was placed in a vertical glass tower fitted at the lower end with a gas disperser, outlet for oxidate, drain and thermocouple point, and at the upper end with a reflux condenser and a decanting head of the Dean and Stark type. A separate liquid inlet with a U-seal was provided at the upper end.

The glass tower and its contents were heated to 80° C., and a fine dispersion of oxygen was passed through the liquid. The concentration of hydroperoxide in the liquid rose steadily, and, when it reached 15% by weight, liquid was pumped off from the outlet of the tower at the lower end to an extraction apparatus, in which it was contacted with a 4% aqueous solution of sodium hydroxide to extract the dihydroperoxide. The organic phase from the extraction was treated in four different ways, described below, for the removal of alkali therefrom, before being recycled to the oxidiser. The hydroperoxide concentration in the oxidiser continued to rise, until steady state conditions were reached.

The recycle organic phase was treated in the following ways:

*Method 1.*—The organic phase was agitated with a solution of sodium sulphate, containing excess sulphuric acid and of pH 5, and the phases were separated. This proved ineffective for lowering the pH of the recycle oxidate, and the oxidiser contents became comparatively strongly alkaline at about pH 12, with the result that the oxidation became very inefficient and the dihydroperoxide recovered contained about 24% by weight of hydroxyhydroperoxide.

*Method 2.*—The procedure of Method 1 was followed, but an aqueous buffer solution of sodium phosphate (pH 5–6) was used in place of the acid sodium sulphate. The results were no better than in Method 1.

*Method 3.*—The washing liquid used in Method 1 was replaced by pure water, and carbon dioxide was bubbled into the agitated mixture. The decanted, recycle organic phase was found to have pH 9–10, and the oxidiser did not become so alkaline as before. The dihydroperoxide produced contained only 12% of hydroxyhydroperoxide.

*Method 4.*—Finally, the organic phase was allowed to percolate down a tower packed with porcelain rings, together with washing water, and in countercurrent flow to gaseous carbon dioxide. The pH of the recycle oxidate was 8–9, and the improved oxidation efficiency was shown by the reduction of the hydroxyhydroperoxide content of the dihydroperoxide product to 9%.

We claim:
1. A process for the oxidation of a dialkyl aromatic hydrocarbon having the formula

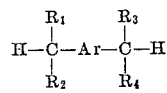

wherein Ar is an arylene group and $R_1$, $R_2$, $R_3$ and $R_4$ are alkyl groups having from 1 to 4 carbon atoms which comprises contacting said hydrocarbon with molecular oxygen to form an oxidate containing the monohydroperoxide thereof and the dihydroperoxide thereof, the oxidation being carried out at a pH within the range from about 3 to about 7, subjecting the oxidate to extraction with an aqueous alkali metal hydroxide having a concentration in the range of about 1% to about 12% in an amount sufficient to form as aqueous phase an aqueous alkali solution of said dihydroperoxide, and as organic phase the residual oxidate, separating said alkali solution of dihydroperoxide from the residual oxidate, by phase separation of the two liquid phases, intimately contacting said residual oxidate containing said monohydroperoxide with gaseous carbon dioxide in an amount sufficient to neutralise the alkali metal hydroxide content of said residual oxidate, extracting the carbon dioxide-treated residual oxidate with water in an amount sufficient to form as aqueous phase an aqueous solution of the salts formed by the carbon dioxide treatment, and as organic phase the residual oxidate, separating said aqueous solution of salts from the residual oxidate by phase separation of the two liquid phases, and recycling said residual oxidate containing said monohydroperoxide to the oxidation step.

2. The process of claim 1 wherein the hydrocarbon oxidised is m-diisopropylbenzene.

3. The process of claim 1 wherein the hydrocarbon oxidised is p-diisopropylbenzene.

4. The process of claim 1 wherein the alkali metal hydroxide is sodium hydroxide.

References Cited

UNITED STATES PATENTS 2,715,646  8/1955  Hawkins et al. _____ 260—610
2,856,433  10/1958  Thompson _____ 260—610

FOREIGN PATENTS 727,498  2/1955  Great Britain.

LEON ZITVER, *Primary Examiner.*
W. B. LONE, *Assistant Examiner.*